Reissued Apr. 9, 1929. Re. 17,264

UNITED STATES PATENT OFFICE.

JOSEPH J. SCHAEFER, JR., OF NIAGARA FALLS, NEW YORK, ASSIGNOR TO NIACET CHEMICALS CORPORATION, A CORPORATION OF NEW YORK.

TEXTILE LUBRICANT AND PROCESS.

No Drawing. Original No. 1,677,852, dated July 17, 1928, Serial No. 244,774, filed January 5, 1928. Application for reissue filed February 6, 1929. Serial No. 338,023.

This invention relates to a textile lubricant and to a process of using such a lubricant in the manufacture of the textiles.

In the manufacture of textile fabrics, and more particularly in the manufacture of woolens and worsteds, it is customary to apply a lubricant to the raw material to preserve the fibers or threads of the material by facilitating the separation and straightening of the same. In the working of virgin wool it is necessary to lubricate the material but once, prior to carding, but when using reworked wool, which is known as shoddy, the material must be twice lubricated if it is to be dyed. Shoddy usually consists in part at least of woolen rags but it may contain some vegetable fibers and is subjected to what is known as the picking operation to separate the fibers or threads of the rags. With the ordinary lubricant, which may be red oil, the shoddy is first lubricated to preserve the fiber, then picked and then cleansed to remove the lubricant, the dyeing taking place between the picking and carding operations. After dyeing the material is dried, again lubricated, carded, manufactured into fabric and again cleansed. The character of the lubricant generally used is such that it difficult to remove it from the material and it is necessary to employ large quantities of soap and other detergents which are injurious to the woolen fibers, particularly if used in large quantities, and most oils also have a more or less injurious effect upon the apparatus used in handling the material. Further, the material containing the lubricant, when piled or baled in quantities, is subject to spontaneous combustion.

One object of the invention is to provide a textile lubricant which can be quickly and easily removed from the material; which will have no harmful effect upon the material itself or upon the apparatus used in handling the same; and which will not be subject to spontaneous combustion.

A further object of the invention is to provide a textile lubricant of such a character that the material containing the same need not be washed prior to the dyeing operation but the lubricant itself may be so treated as to provide the chemicals usually used with the dye stuff in the dyeing operation.

A further object of the invention is to provide a process of using my improved lubricant in the manufacture of textiles.

Other objects of the invention will appear as the invention is described in detail.

To secure the desired results I employ a lubricant containing an alkali metal lactate, such as sodium lactate, potassium lactate or the like, which is applied to the material to be lubricated in the form of a solution. I prefer to use sodium lactate because it is relatively inexpensive and is one of the most stable of the alkali metal lactates, not being subject to decomposition. Any suitable solution may be employed but very satisfactory results are secured by the use of sodium lactate and water in substantially equal quantities. Some textiles, such as virgin wool, require lubricating but once, that is, before the carding operation. The lubricant is applied to such textile stock or material in suitable quantities, usually about fifteen percent of the weight of the material to be lubricated, and the material is then carded and spun into a yarn and is ready to be woven into a fabric. After weaving and shrinking the fabric is then cleansed to remove the lubricant by washing. The sodium lactate being soluble in water can be very easily removed from the material and requires the use of but a small quantity of soap, without other detergents which might have an injurious effect upon the finished material.

Some other textile materials, more particularly shoddy, require a picking operation to separate the fibers or threads thereof prior to the carding and are dyed between the picking and carding operations. With such materials the raw material is lubricated prior to the picking operation, in the same manner that the virgin wool is lubricated prior to carding. In the dyeing of shoddy it is customary to employ a dye which requires the use of a leveling agent, such as sodium sulphate, and of an acid, such as lactic acid as a dyeing assistant. With the ordinary lubricants the picked shoddy is washed to remove the lubricant therefrom and the leveling agent and assisting acid are added. With my improved lubricant it is unnecessary to wash or otherwise cleanse the material before dyeing but the material is subjected to the action of an acid which will convert the lubricant into other substances which will serve as the leveling agent and dyeing assistant. When sodium lactate is used as the lubricant I add to the material containing the lubricant a small quantity of acid, preferably sulphuric acid, and this acid will react upon the sodium lactate to form sodium sulphate and lactic acid. The sulphuric acid may be added in any suitable manner, as by placing it in the dye solution in which the material is immersed. In this manner the lubricant or sodium lactate is chemically removed from the material, so that it will not be present to interfere with the dyeing, and by the use of a very inexpensive mineral acid the lubricant itself is converted into sodium sulphate, thereby providing the necessary leveling agent, and into lactic acid which is one of the most desirable of the organic acids for use as a dyeing assistant, as it has little or no harmful effect upon the material. After the picked shoddy has been dyed the surplus liquid is extracted therefrom, as by the usual drying process or by the use of a centrifugal apparatus, and it is then again lubricated and carded, after which the manufacturing and cleansing operations proceed as in the case of virgin wool.

It will be apparent, therefore, that by the use of my improved lubricant in the manner above set forth I materially cheapen the manufacturing processes by simplifying and cheapening the cleansing operation, and in the case of shoddy or the like by eliminating one cleansing operation. Further, I expedite and cheapen the manufacture of shoddy both by elimination of the washing prior to dyeing and by the conversion of the lubricant into the necessary leveling agent and dyeing assistant. Further, I practically eliminate all liability of injuring the textile material during the manufacturing process, because the sodium lactate itself has no injurious action thereon and its removal does not require the use of alkalies or other substances which are injurious to the fibers. Due to the fact that it is not necessary to employ large quantities of soap, alkalies or other detergents in the removal of the lubricant the finished product is much more satisfactory than it is when subjected to the ordinary washing operations, because it is softer and has a better luster. My improved lubricant has no injurious effect upon the apparatus, such as leather conveyors and the like, used in the handling of the material and material containing the same is not subject to spontaneous combustion.

Having now fully described my invention, what I claim as new and desired to secure by Letters Patent, is:

1. A textile lubricant containing an alkali metal lactate.

2. A textile lubricant comprising an aqueous solution of an alkali metal lactate.

3. A textile lubricant containing sodium lactate.

4. A textile lubricant comprising a solution of sodium lactate and water.

5. A textile lubricant comprising approximately equal parts of an alkali metal lactate and water.

6. A process of treating textile fibers comprising the application of a solution of alkali metal lactate to a material to be treated, carding the material, manufacturing said material into fabric and removing the lactate from the fabric.

7. A process of treating textiles comprising the application of a solution of an alkali metal lactate to a material to be treated, carding the material, manufacturing said material into fabric and washing the fabric in water to dissolve the lactate and remove the same from the fabric.

8. A process of treating textiles comprising the application of a solution of an alkali metal lactate to the material to be treated, separating the fibers of said material, applying to the material containing the lactate an acid which will react on the lactate to liberate lactic acid, dyeing the material and then drying the dyed material.

9. A process of treating textiles comprising the application of a solution of sodium lactate to the material to be dyed, separating the fibers of said material, subjecting the material containing the lactate to the action of sulphuric acid to convert the sodium lactate into sodium sulphate and lactic acid, dyeing the material, extracting the surplus water from the dyed material, again applying a solution of sodium lactate to the material, carding the material, manufacturing the carded material into fabric and then washing the fabric to remove the lactate therefrom.

10. A process of treating textiles comprising the application of a solutin of sodium lactate to the material to be treated, separating the fibers of said material, immersing the material containing said sodium lactate in a dye solution containing sulphuric acid, extracting the surplus water from the dyed material, again applying sodium lactate to the material, carding the material, manufacturing the carded material into fabric and washing the fabric in water to dissolve the lactate and remove the same therefrom.

11. A process of treating textiles comprising the steps of applying thereto a fiber-lubricating solution of an alkali metal salt of an organic acid; manipulating the fibers; applying an acid to decompose said salt, forming a salt having leveling properties, and an acid having dye-assisting properties; dyeing the fibers; and thereafter washing out the leveling salt and the dye-assisting acid.

In testimony whereof, I affix my signature.

JOSEPH J. SCHAEFER, Jr.